(12) United States Patent
Koh et al.

(10) Patent No.: US 8,633,973 B2
(45) Date of Patent: Jan. 21, 2014

(54) THREE DIMENSIONAL IMAGE DISPLAY DEVICE AND METHOD OF DRIVING THE SAME

(75) Inventors: Jai-Hyun Koh, Anyang-si (KR); Bong-Hyun You, Yongin-si (KR); Jae-Sung Bae, Suwon-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 463 days.

(21) Appl. No.: 12/913,337

(22) Filed: Oct. 27, 2010

(65) Prior Publication Data

US 2011/0234773 A1 Sep. 29, 2011

(30) Foreign Application Priority Data

Mar. 25, 2010 (KR) .................. 10-2010-0026791

(51) Int. Cl.
*H04N 9/47* (2006.01)
*H04N 13/04* (2006.01)

(52) U.S. Cl.
USPC .................. 348/56; 348/51; 348/E13.075

(58) Field of Classification Search
USPC .......................................... 348/56
See application file for complete search history.

(56) References Cited

U.S. PATENT DOCUMENTS

| | | | |
|---|---|---|---|
| 2006/0072664 A1 | 4/2006 | Kwon et al. | |
| 2006/0177123 A1* | 8/2006 | Ha | 382/154 |
| 2007/0018934 A1 | 1/2007 | Kim et al. | |
| 2007/0229951 A1 | 10/2007 | Jung et al. | |
| 2009/0317062 A1* | 12/2009 | Jung et al. | 386/95 |
| 2010/0033462 A1* | 2/2010 | Hasegawa et al. | 345/211 |
| 2010/0039428 A1* | 2/2010 | Kim et al. | 345/419 |
| 2010/0182404 A1* | 7/2010 | Kuno | 348/43 |
| 2011/0122227 A1* | 5/2011 | Kim | 348/43 |
| 2011/0126160 A1* | 5/2011 | Han et al. | 715/848 |
| 2012/0033042 A1* | 2/2012 | Mori et al. | 348/43 |

FOREIGN PATENT DOCUMENTS

| | | |
|---|---|---|
| JP | 2003-061116 | 2/2003 |
| JP | 2004-336334 | 11/2004 |
| JP | 2006-133752 | 5/2006 |
| JP | 2007-279717 | 10/2007 |
| KR | 10-0588132 | 6/2006 |
| KR | 10-0691324 | 2/2007 |
| KR | 10-0716992 | 5/2007 |
| KR | 1020070099143 | 10/2007 |
| KR | 1020080078770 | 8/2008 |
| KR | 10-0888081 | 3/2009 |
| KR | 1020090065214 | 6/2009 |

* cited by examiner

*Primary Examiner* — Dave Czekaj
*Assistant Examiner* — Nam Pham
(74) *Attorney, Agent, or Firm* — F. Chau & Associates, LLC

(57) ABSTRACT

A 3D image display device includes a data receiving unit receiving frame data. The frame data includes left eye image data and right eye image data. An image modification unit generates modification image data corresponding to one of the left eye image data and the right eye image data. The modification image data corresponding to the left eye image data is based on left eye image data of a current frame and left eye image data of a next frame. The modification image data corresponding to the right eye image data is based on right eye image data of the current frame and right eye image data of the next frame. Utilization of the modification image data improves the display quality of moving objects in the 3D image display device.

23 Claims, 13 Drawing Sheets

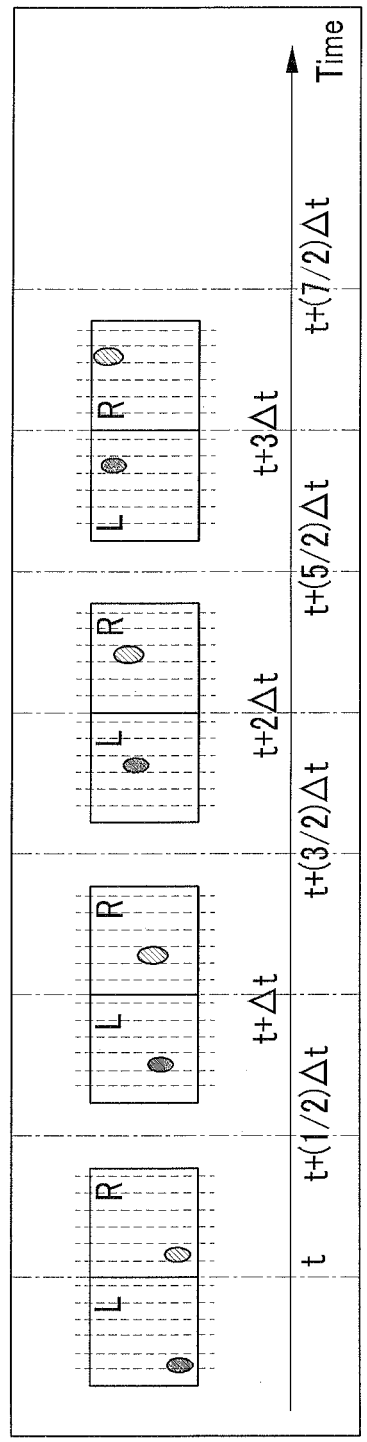

THREE DIMENSIONAL IMAGE DISPLAY DEVICE AND METHOD OF DRIVING THE SAME

CROSS-REFERENCE TO RELATED APPLICATION

This application claims priority to and the benefit of Korean Patent Application No. 10-2010-0026791 filed in the Korean Intellectual Property Office on Mar. 25, 2010, the entire contents of which are incorporated by reference herein.

BACKGROUND OF THE INVENTION (a) Technical Field

A three dimensional image display device and a method of driving the same are provided.

(b) Discussion of the Related Art

In the technology area of three-dimensional image display, a stereoscopic effect for viewing an object is accomplished using binocular parallax. Binocular parallax allows a person to perceive the stereoscopic effect at a close range. For example, binocular parallax results in the perception of different 2D images by a right eye and a left eye, respectively. When the image seen by the left eye (hereinafter referred to as a "left-eye image") and the image seen by the right eye (hereinafter referred to as a "right-eye image") are transmitted to the brain, the left-eye image and the right-eye image are combined by the brain, resulting in the perception of a 3D image having depth.

Stereoscopic image display devices using the binocular parallax effect to display 3D images on 3D image displays may utilize stereoscopic schemes using glasses, such as shutter glasses or polarized glasses, or autostereoscopic schemes in which a lenticular lens or a parallax barrier is disposed between a user and the display device. Autostereoscopic schemes may operate without the use of special glasses.

In a stereoscopic image display device using the shutter glasses scheme, the left-eye image and the right-eye image are sequentially time-separated and continuously output, and the left-eye shutter and the right-eye shutter of the shutter glasses are selectively opened or closed such that the left-eye image and the right-eye image are sequentially viewed by the user. As a result, a stereoscopic image is displayed. The shutter glasses scheme may allow a display device to switch between a 2D mode and a 3D mode without a loss of data. However, switching between a 2D mode and a 3D mode may result in jittering, shaking or interruption of moving objects in the left eye image and the right eye image.

SUMMARY OF THE INVENTION

According to an exemplary embodiment of the present invention, a 3D image display device includes a data receiving unit configured to receive frame data including left eye image data and right eye image data, and an image modification unit configured to generate modification image data corresponding to one of the left eye image data and the right eye image data. The modification image data corresponding to the left eye image data is based on left eye image data of a current frame and left eye image data of a next frame, and the modification image data corresponding to the right eye image data is based on right eye image data of a current frame and right eye image data of a next frame.

The image modification unit may be configured to generate the modification image data using a motion vector.

The 3D image display device may further include a data storing unit connected to the image modification unit, configured to store the left eye image data of the current frame or the right eye image data of the current frame.

The 3D image display device may further include an image delaying unit configured to delay one of the left eye image data and the right eye image data.

The 3D image display device may further include an image dividing unit configured to divide the frame data into the left eye image data and the right eye image data, transmit one of the left eye image data and the right eye image data to the image modification unit, and transmit the other one of the left eye image data and the right eye image data to the image delaying unit.

The 3D image display device may further include an image converting unit configured to upscale the left eye image data and the right eye image data, and time-divide the left eye image data and the right eye image data.

The image converting unit may be configured to insert black image data between an input period of the left eye image data and an input period of the right eye image data.

The image converting unit may be configured to bypass the 2D image data.

The 3D image display device may further include a shutter member including a left eye shutter and a right eye shutter. The left eye shutter may be opened after a predetermined time, wherein the predetermined time starts when an input of the left eye image data completes, or the right eye shutter may be opened after the predetermined time, wherein the predetermined time starts when an input of the right eye image data completes.

The 3D image display device may further include a display device including a liquid crystal material, wherein the predetermined time is based on a response time of the liquid crystal material.

The 3D image display device may further include a shutter member including a left eye shutter and a right eye shutter. One of the left eye shutter and the right eye shutter may be opened and the other one of the left eye shutter and the right eye shutter may be closed between an input period of the left eye image data and an input period of the right eye image data.

According to an exemplary embodiment of the present invention, a method of driving a 3D image display device includes receiving left eye image data and right eye image data, and modifying one of left eye image data and the right eye image data. The left eye image data is modified based on left eye image data of a current frame and left eye image data of a next frame, and the right eye image data is modified based on right eye image data of the current frame and right eye image data of the next frame.

Modifying one of the left eye image data and the right eye image data may be based on a motion vector.

The method of driving the 3D image display device may further include delaying the one of the left eye image data and the right eye image data that is not modified.

The method of driving the 3D image display device may further include receiving frame data including the left eye image data and the right eye image data, and dividing the frame data into the left eye image data and the right eye image data.

The method of driving the 3D image display device may further include upscaling the left eye image data and the right eye image data.

The method of driving the 3D image display device may further include time-dividing the left eye image data and the right eye image data.

The method of driving the 3D image display device may further include inserting black image data between an input period of the left eye image data and an input period of the right eye image data.

According to an exemplary embodiment of the present invention, a 3D image display device may include a data receiving unit configured to receive data including left eye image data and right eye image data, an image dividing unit configured to divide the frame data into the left eye image data and the right eye image data, an image delaying unit configured to delay one of the left eye image data and the right eye image data, and an image modification unit configured to generate modification image data corresponding to the other one of the left eye image data and the right eye image data. The modification image data corresponding to the left eye image data is based on left eye image data of a current frame and left eye image data of a next frame, and modification image data corresponding to the right eye image data is based on right eye image data of the current frame and right eye image data of the next frame.

BRIEF DESCRIPTION OF THE DRAWINGS

FIGS. 5A to 5D are diagrams schematically showing a process of displaying video on the 3D image display device according to an exemplary embodiment of the present invention;

DETAILED DESCRIPTION OF THE EXEMPLARY EMBODIMENTS

Figure 1:
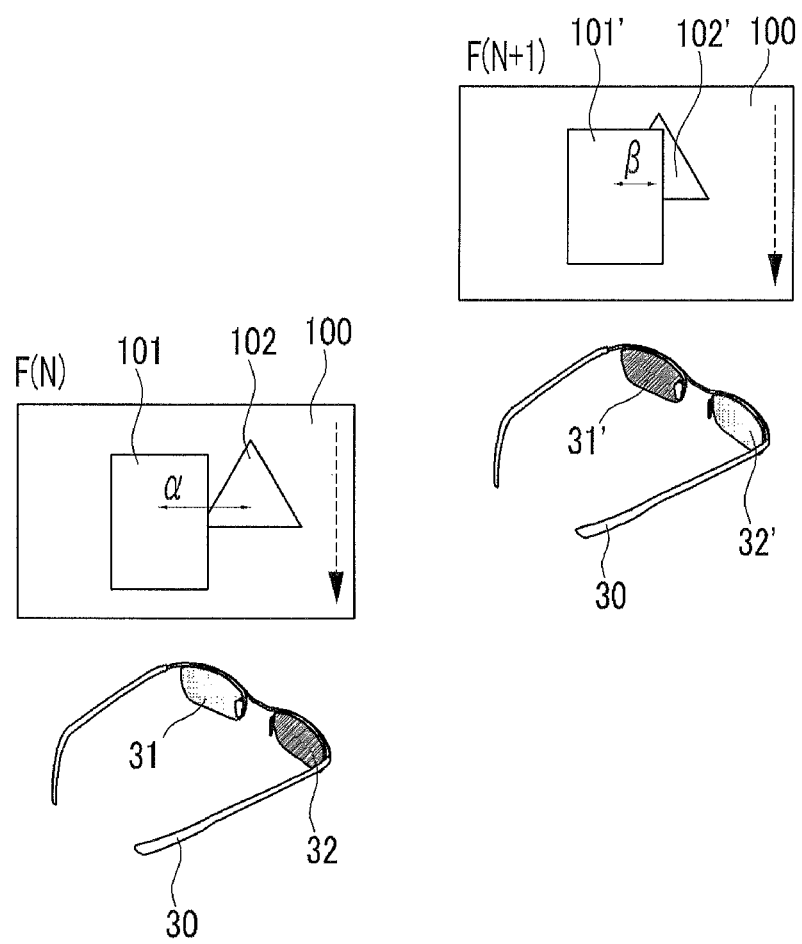
FIG. 1 is a diagram schematically showing an operation of a 3D image display device according to an exemplary embodiment of the present invention.

Exemplary embodiments of the present invention will be described more fully hereinafter with reference to the accompanying drawings. The invention may, however, be embodied in many different forms and should not be construed as limited to the exemplary embodiments set forth herein.

In the drawings, the thickness of layers, films, panels, regions, etc., may be exaggerated for clarity. Like reference numerals may designate like elements throughout the specification and drawings. It will be understood that when an element such as a layer, film, region, or substrate is referred to as being "on" another element, it may be directly on the other element or intervening elements may also be present. A 3D image display device according to an exemplary embodiment of the present invention will be described with reference to FIGS. 1 to 4.

Figure 2:
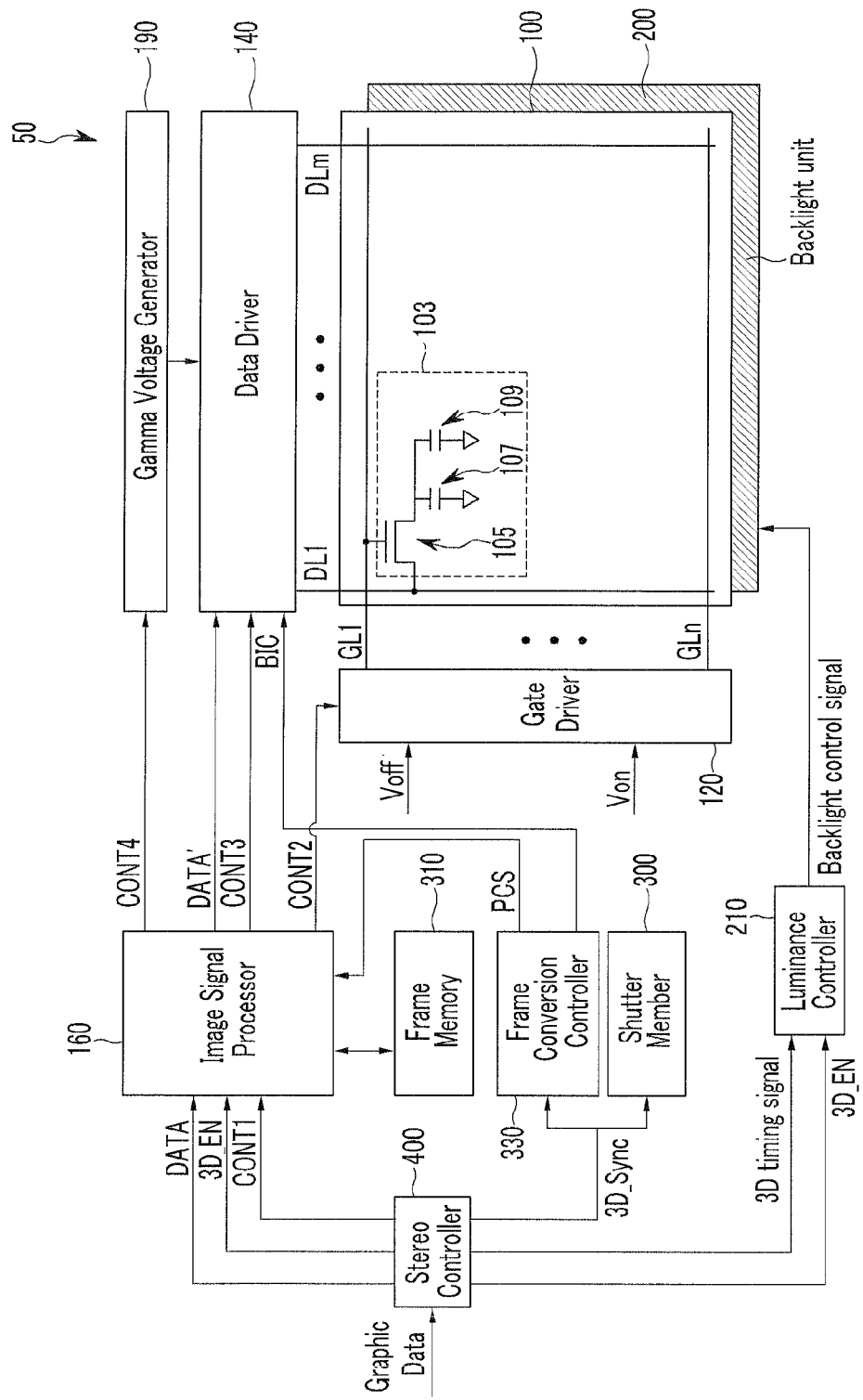
FIG. 2 is a diagram schematically showing the 3D image display device according to an exemplary embodiment of the present invention.
Figure 3:
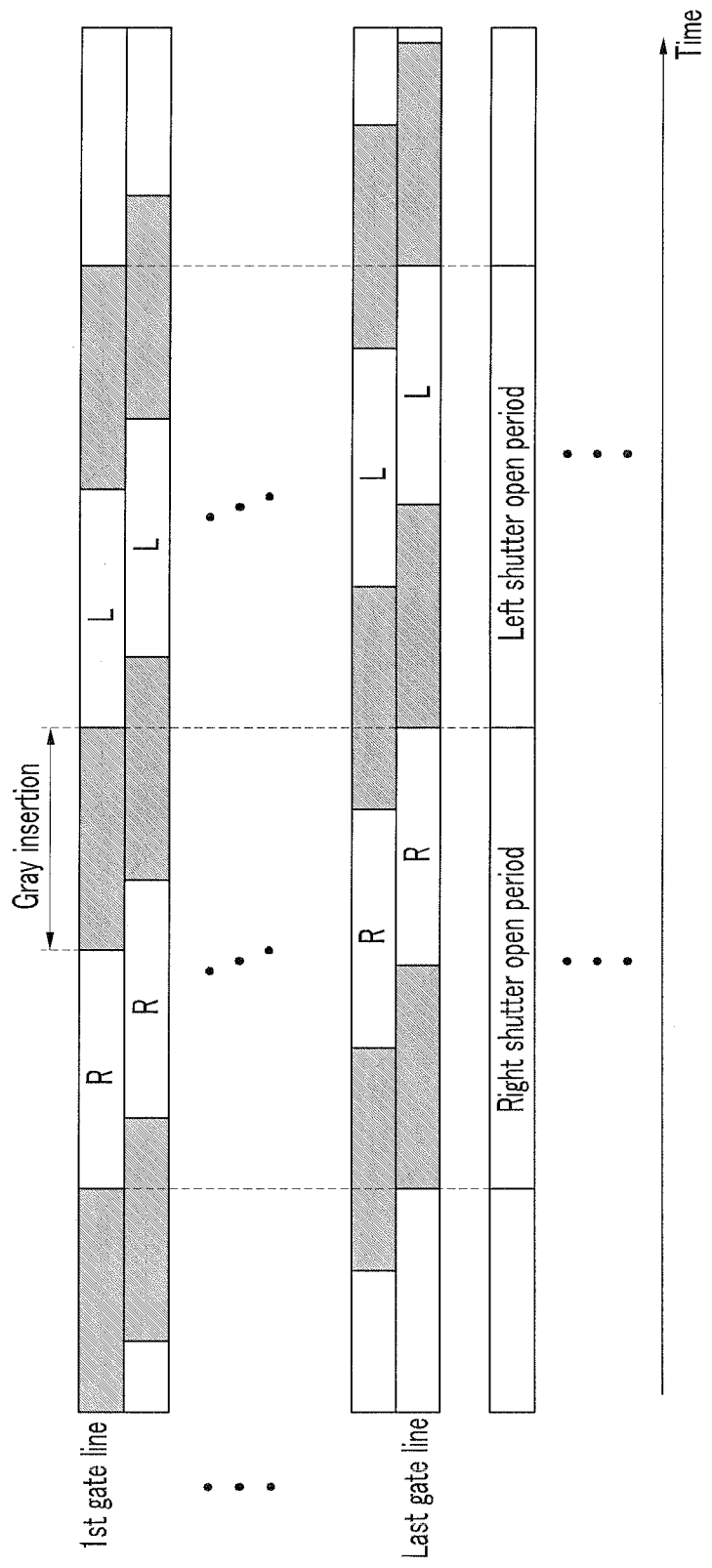
FIG. 3 is a graph showing a signal waveform of the 3D image display device according to an exemplary embodiment of the present invention.
Figure 4:
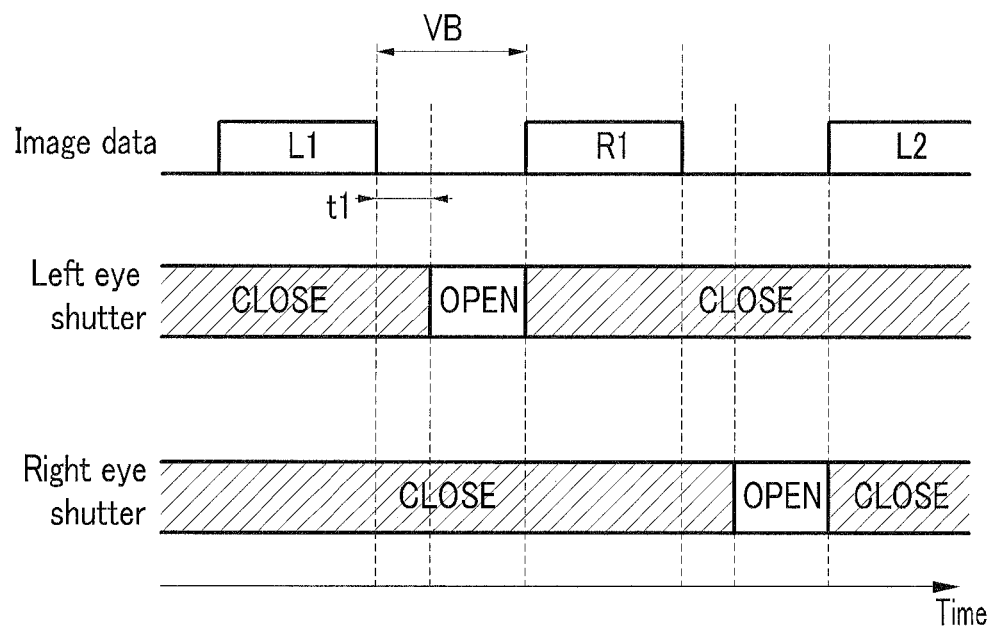
FIG. 4 is a graph showing a signal waveform of the 3D image display device according to an exemplary embodiment of the present invention.

FIG. 1 is a diagram schematically showing an operation of a 3D image display device according to an exemplary embodiment of the present invention. FIG. 2 is a diagram schematically showing the 3D image display device according to an exemplary embodiment of the present invention. FIG. 3 is a graph showing a signal waveform of the 3D image display device according to an exemplary embodiment of the present invention. FIG. 4 is a graph showing a signal waveform of a 3D image display device according to an exemplary embodiment of the present invention.

A display device 100 may include, for example, a liquid crystal display device, an organic light emitting device, a plasma display device or an electrophoretic display device. Hereinafter, exemplary embodiments of the present invention having a liquid crystal display as the display device 100 will be described with reference to FIG. 1 to FIG. 8, however, the display device 100 is not limited thereto.

The display device 100 may include an upper substrate, a lower substrate and a liquid crystal layer disposed between the upper substrate and the lower substrate. The alignment of a liquid crystal in the liquid crystal layer is changed by generating an electric field between two electrodes, thereby displaying images by controlling transmittance of light.

Gate lines (GL1 ... GLn), data lines (DL1 ... DLm), a pixel electrode and a thin film transistor 105 connected thereto are positioned on the lower substrate. The thin film transistor 105 controls a voltage applied to the pixel electrode based on signals applied to the gate lines and the data lines. The pixel electrode may include a transflective pixel electrode having a transmission region and a reflection region. In addition, a storage capacitor 107 may be further formed on the lower substrate. The storage capacitor 107 allows the voltage applied to the pixel electrode to be maintained for a predetermined time. For example, one pixel 103 may include the thin film transistor 105, the storage capacitor 107, and a liquid crystal capacitor 109.

A black matrix, a color filter, and a common electrode may be positioned on the upper substrate facing the lower substrate. In an exemplary embodiment, at least one of the color filter, the black matrix, and the common electrode formed on the upper substrate may be formed on the lower substrate. When both the common electrode and the pixel electrode are formed on the lower substrate, at least one of the electrodes may be formed in a linear formation.

The liquid crystal layer may include, for example, a liquid crystal in a TN (twisted nematic) mode, a liquid crystal in a VA (vertically aligned) mode or a liquid crystal in an ECB (electrically controlled birefringence) mode.

A polarizer may be attached to the outside of the upper substrate and the outside of the lower substrate, respectively. Further, a compensation film may be added between the substrate and the polarizer.

A backlight unit 200 includes a light source. The light source may be, for example, a fluorescent lamp such as, for example, a CCFL (cold cathode fluorescent lamp), or an LED (light emitting diode). The backlight unit may further include, for example, a reflector, a light guide or a luminance improving film.

Referring to FIG. 2, a display apparatus 50 may include, for example, the display device 100, the backlight unit 200, a data driver 140, a gate driver 120, an image signal processor 160, a gamma voltage generator 190, a luminance controller 210, a shutter member 300, a frame memory 310, a frame conversion controller 330 and a stereo controller 400. The stereo controller 400 may transmit a 3D timing signal and a 3D enable signal (3D_EN) to the luminance controller 210. The luminance controller 210 may transmit a backlight control signal to the backlight unit 200. The backlight unit 200 may be turned on or off in response to the backlight control signal sent through the luminance controller 210 and the stereo controller 400. The backlight control signal transmitted to the backlight unit 200 may cause the backlight unit 200 to turn on for a predetermined time. For example, the backlight control signal transmitted to the backlight unit 200 may cause the backlight unit to turn on for a vertical blank (VB) time period or for another time period.

The stereo controller 400 may transmit a 3D sync signal (3D_Sync) to the shutter member 300 and the frame conversion controller 330. The frame conversion controller 330 transmits a signal PCS to the image signal processor 160 and transmits a signal BIC to the data driver 140. The shutter member 300 may be electrically connected to the stereo controller 400. The shutter member 300 may receive the 3D sync signal (3D_Sync) using wired communication or wireless communication such as, for example, infrared. The shutter member 300 may be operated in response to the 3D sync signal (3D_Sync) or a modified 3D sync signal. The 3D sync signal (3D_Sync) may be utilized to open or close the left eye shutter or the right eye shutter. The 3D sync signal (3D_Sync) will be described in more detail below with reference to FIGS. 2 to 8.

The stereo controller 400 may transmit display data (DATA) to the image signal processor 160. The image signal processor 160 may transmit various display data and various control signals to the display device 100 through at least one component such as, for example, the gate driver 120, the data driver 140 or the gamma voltage generator 190 in order to display images on the display device 100. In the 3D image display device, the display data (DATA) may include, for example, the left eye image data and the right eye image data. The display data (DATA) input to the display device 100 is described in more detail below with reference to FIGS. 2 to 8.

Referring to FIG. 1, the shutter member 300 may include shutter glasses 30, however, the shutter member 300 is not limited thereto. For example, the shutter member 300 may include mechanical shutter glasses (e.g., goggles) or optical shutter glasses. The shutter glasses 30 are tuned to the display device 100, and are configured to allow right eye shutters 32 and 32' and left eye shutters 31 and 31' to alternately block light for a predetermined period. For example, the right eye shutter may be in a closed state 32 or an opened state 32', and the left eye shutter may be in an opened state 31 or a closed state 31'. While the right eye shutter is in an opened state, the left eye shutter may be in a closed state, and while the left eye shutter is in an opened state, the right eye shutter may be in a closed state. In addition, both the left eye shutter and the right eye shutter may simultaneously be in an opened state or in a closed state.

The shutters of the shutter glasses 30 may be formed using technologies such as, for example, a liquid crystal display device, an organic light emitting device or an electrophoretic display device, however, the shutters are not limited thereto. For example, the shutters may include two transparent conductive layers and a liquid crystal layer positioned between the conductive layers. A polarization film may be positioned on the surface of the conductive layers. The liquid crystal material is rotated by a voltage applied to the shutters. The rotation causes the shutters to switch between an opened state and a closed state.

For example, when the left eye images 101 and 102 are output to the display device 100, the left eye shutter 31 of the shutter glasses 30 enters an opened state (OPEN) and the right eye shutter 32 enters a closed state (CLOSE). Light is transmitted while in the opened state (OPEN) and blocked while in the closed state (CLOSE). When the right eye images 101' and 102' are output to the display device 100, the right eye shutter 32' of the shutter glasses 30 enters an opened state (OPEN) and the left eye shutter 31' enters a closed state (CLOSE). As a result, only the left eye recognizes the left eye image for a predetermined time and only the right eye recognizes the right eye image for a predetermined time. The difference between the left eye image and the right image results in the perception of 3D images having depth when viewed by a person using the shutter glasses 30.

The image recognized by the left eye is an image displayed at an N-th frame (F(N)). In FIG. 1, the image is a quadrilateral 101 and a triangle 102 spaced apart by a distance $\alpha$. The image recognized by the right eye is an image displayed at an N+1-th frame (F(N+1)). In FIG. 1, the image is a quadrilateral 101' and a triangle 102' spaced apart by a distance $\beta$. $\alpha$ and $\beta$ may have the same values or different values. As described above, when a distance between the quadrilateral 101 and the triangle 102 recognized by both eyes is different, the quadrilateral appears behind the triangle, creating a feeling of depth perception. The distance between the quadrilateral 101 and the triangle 102 may be controlled by controlling the distance $\alpha$ and $\beta$ between the objects.

Referring to FIG. 1, an arrow illustrates the direction that a gate-on voltage is applied to the plurality of gate lines GL1 to GLn in the display device 100. For example, the gate-on signals are applied from the upper gate line GL1 to the lower gate line GLn of the display device 100.

Referring to FIG. 2, the display device 100 may display the left eye images 101 and 102 as follows. The gate-on voltage is sequentially applied to the gate lines from GL1 to GLn, such that a data voltage is applied to the pixel electrodes 103 through the thin film transistor 105 connected to the corresponding gate line. The applied data voltage (hereinafter referred to as "left eye data voltage") corresponds to the left eye images 101 and 102. The applied left eye data voltage may be maintained for a predetermined time by the storage capacitor 107. In a similar manner, the data voltage (hereinafter referred to as "right eye data voltage") corresponding to the right eye images 101' and 102' is applied to pixel electrodes 103 through the thin film transistor 105 connected to the corresponding gate line, and may be maintained for a predetermined time by the storage capacitor 107.

FIG. 3 is a graph showing a signal waveform of the 3D display device, according to an exemplary embodiment. In FIG. 3, the gate-on signals are sequentially applied from the first gate line to the last gate line, such that the right eye images (R) may be sequentially applied to the plurality of pixels connected to the corresponding gate lines and the left eye images (L) may be sequentially applied to the plurality of pixels connected to the corresponding gate lines. While the right eye images (R) are sequentially applied to the plurality of pixels connected to the corresponding gate lines, the right eye shutter may be in an opened state and the left eye shutter may be in a closed state. Similarly, while the left eye images (L) are sequentially applied to the plurality of pixels connected to the corresponding gate lines, the left eye shutter may be in an opened state and the right eye shutter may be in a closed state.

Images having a predetermined gray value may be inserted between the input period of the right eye image (R) and the input period of the left eye image (L) (e.g., gray insertion). For example, after the right eye image (R) is displayed on the display device, an image having a color such as, for example, black, gray or white may be displayed on the entire screen, prior to the left eye image (L) being displayed. The predetermined gray value is not limited to black or white. Gray insertion may prevent crosstalk between the right eye image and the left eye image.

FIG. 4 is a graph showing a signal waveform of the 3D display device, according to an exemplary embodiment. In FIG. 4, the left eye image data L1 and L2 and the right eye image data R1 are input to the display device 100. The signal includes image data that may be displayed in a digital or analog format on the display device 100. There is a time period between the input of the left eye image data and the right eye image data where no image data is input. This time period is referred to as a vertical blank (VB). During a VB, either the left eye shutter 31 and 31' or the right eye shutter 32 and 32' of the shutter glasses 30 may be changed to a closed state (CLOSE) for a predetermined time. The predetermined time may be, for example, the duration of the VB. The shutter that is not changed to a closed state (CLOSE) is maintained in an opened state (OPEN). In FIG. 1, the oblique portions of the left eye shutter 31' and the right eye shutter 32 represent a closed state (CLOSE). Both the left eye shutter 31 and 31' and the right eye shutter 32 and 32' may be in a closed state (CLOSE) while the left eye image data or the right eye image data are input.

As shown in FIG. 4, the input of the left eye image data L1 or the right eye image data R1 is completed after the predetermined time t1. At this time, the left eye shutter 31 and 31' or the right eye shutter 32 and 32' may be changed from the closed state (CLOSE) to the opened state (OPEN). Predetermined time t1 may be defined based on a response time of the liquid crystal layer of the display device 100. For example, due to the response time of the liquid crystal layer, a predetermined time t1 may be necessary between the time of the completion of the input of the right eye image data R1 and the output of the right eye images 101' and 102'. After time t1 elapses, the right images 101' and 102' may be viewed by opening the right eye shutter 32 and 32'. Opening the right eye shutter 32 and 32' after the predetermined time t1 elapses may prevent the occurrence of crosstalk between the current image and the previous image.

A process of outputting video in the 3D image display according to an exemplary embodiment of the present invention will be described in detail with reference to FIGS. 5A to 5D.

FIGS. 5A to 5D are diagrams schematically showing a process of displaying video on the 3D image display device according to an exemplary embodiment of the present invention.

Figure 5A:
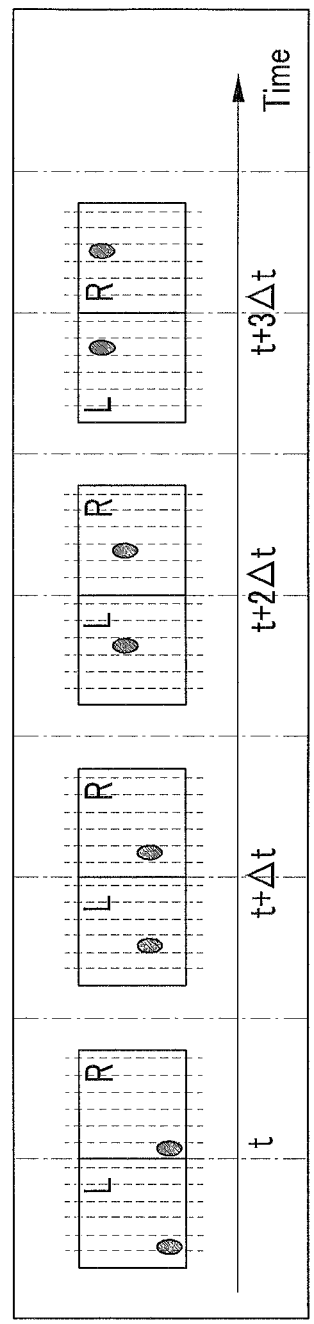
Figure 7:
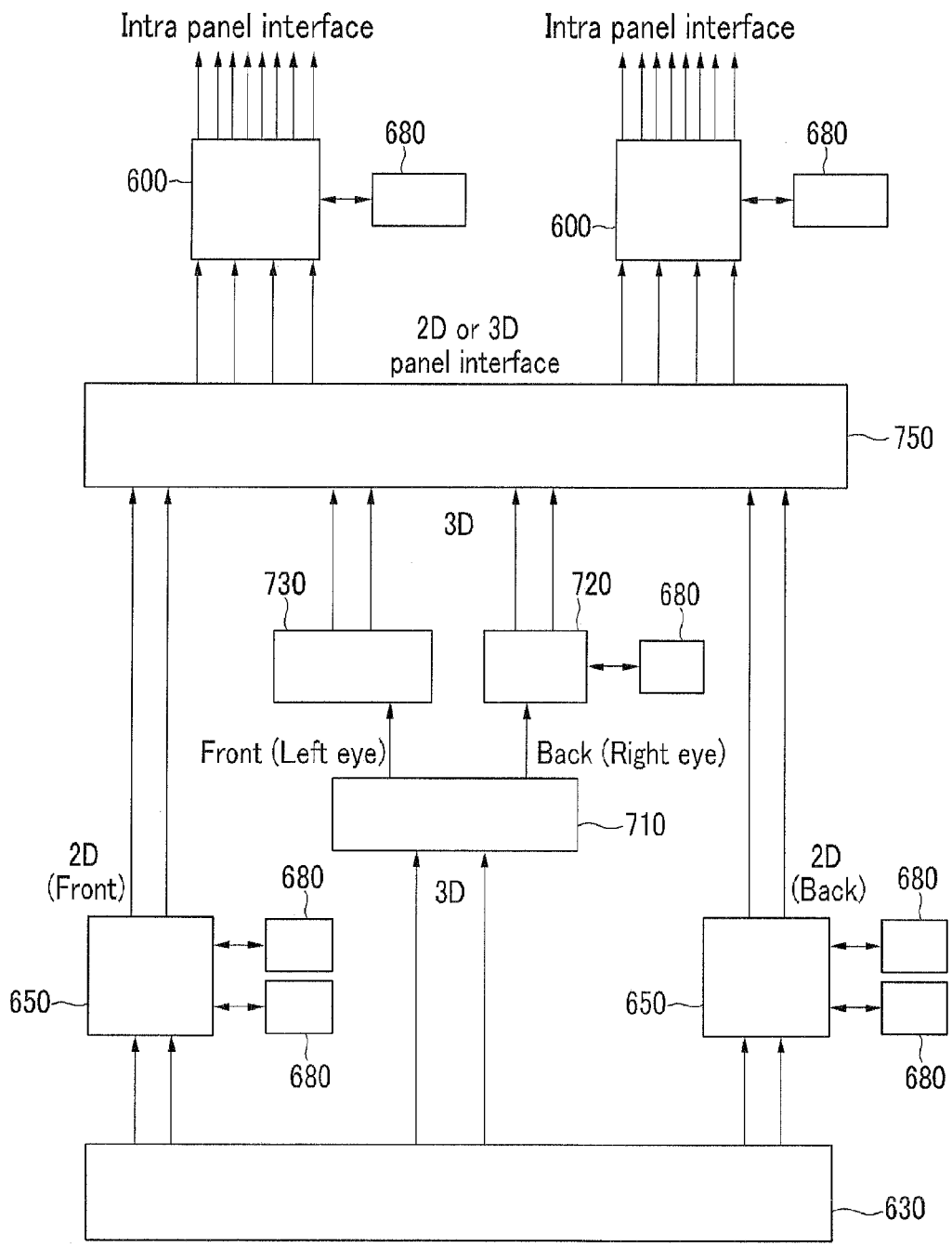
FIG. 7 is a block diagram schematically showing the 3D image display device according to an exemplary embodiment of the present invention.

Referring to FIG. 5A, one object may be shot as the left eye image (L) and the right eye image (R) by two shooting devices such as, for example, two cameras, which are operated at the same time t. This results in the creation of 3D video. In an exemplary embodiment, two cameras are used, however, the number of cameras is not limited thereto. The left eye image (L) and the right eye image (R) form one frame, and the frame is transmitted to the 3D image display device. An apparatus that forms the left eye image (L) and the right eye image (R) as one frame may be, for example, a camera or an image synthesizing apparatus. After a predetermined time elapses ($\Delta t$), the target object, which has moved, is shot again at the same time (t+$\Delta t$) as the left eye image (L) and the right eye image (R). The left eye image (L) and the right eye image (R) form one frame, and the frame is transmitted to the 3D image display device. For example, $\Delta t$ may be 1/60 second, 1/120 second or 1/480 second, however, $\Delta t$ is not limited thereto. The target object is then shot at the same time (t+2$\Delta t$, t+3$\Delta t$) as the left eye image (L) and the right eye image (R), the left eye image (L) and the right eye image (R) are formed as one frame, and the frame is transmitted to the 3D image display device. As shown in FIG. 7, the frames may be transmitted to a data receiving unit 630 of the 3D image display device, and each frame received at the data receiving unit 630 may be divided into the left eye image data and the right eye image data by an image dividing unit 710. This process is described in more detail below.

Figure 5B:
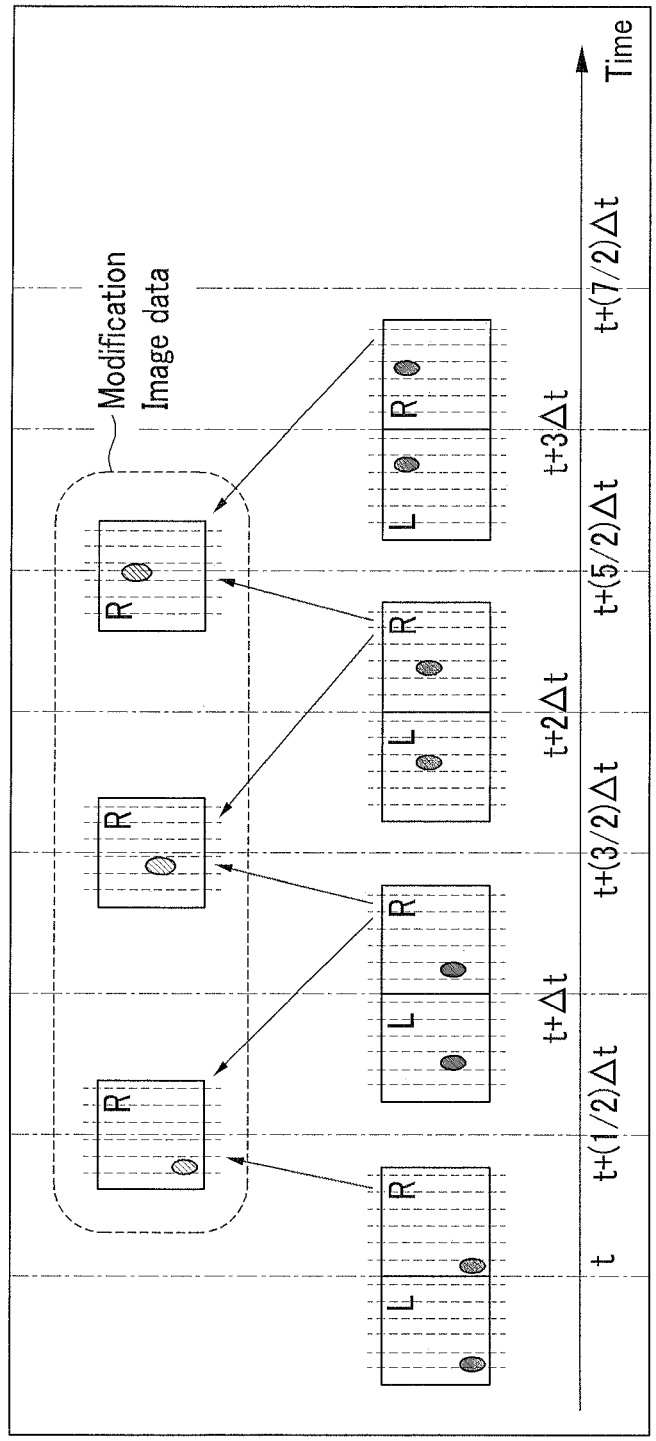

Referring to FIG. 5B, modification image data is formed based on the right eye image (R) of the current frame and the right eye image (R) of the next frame. Similarly, modification image data may be formed based on the left eye image (L) of the current frame and the left eye image (L) of the next frame. In an exemplary embodiment, there may be a predetermined time $\Delta t/2$ between the current frame and the next frame, however, the predetermined time is not limited thereto. Modification image data may be formed using methods such as, for example, a motion estimation method, a motion interpolation method or a motion compensation method. For example, the right eye image (R) may be formed at a time (t+$\Delta t/2$) based on the right eye image (R) at a time t and the right eye image (R) at a time (t+$\Delta t$). Similarly, the right eye image (R) may be formed at a time (t+3$\Delta t/2$) based on the right eye image (R) at a time (t+2$\Delta t$) and the right eye image (R) at a time (t+$\Delta t$), and the right eye image (R) may be formed at a time (t+5$\Delta t/2$) based on the right eye image (R) at a time (t+2$\Delta t$) and the right eye image (R) at a time (t+3$\Delta t$).

Referring to FIG. 5C, the right eye image (R) of each frame may be replaced by the modification image data. For example, the right eye image (R) at a time t may be replaced by the right eye image (R) at a time (t+$\Delta t/2$), the right eye image (R) at a time (t+$\Delta t$) may be replaced by the right eye image (R) at a time (t+3$\Delta t/2$), the right eye image (R) at a time (t+2$\Delta t$) may be replaced by the right eye image (R) at a time (t+5$\Delta t/2$), and the right eye image (R) at a time (t+3$\Delta t$) may be replaced by the right eye image (R) at a time (t+7$\Delta t/2$). The left eye image (L) may not be modified at each time interval that the right eye image (R) is modified. Similarly, the right eye image (R) may not be modified at each time interval that the left eye image (L) is modified.

Figure 5D:
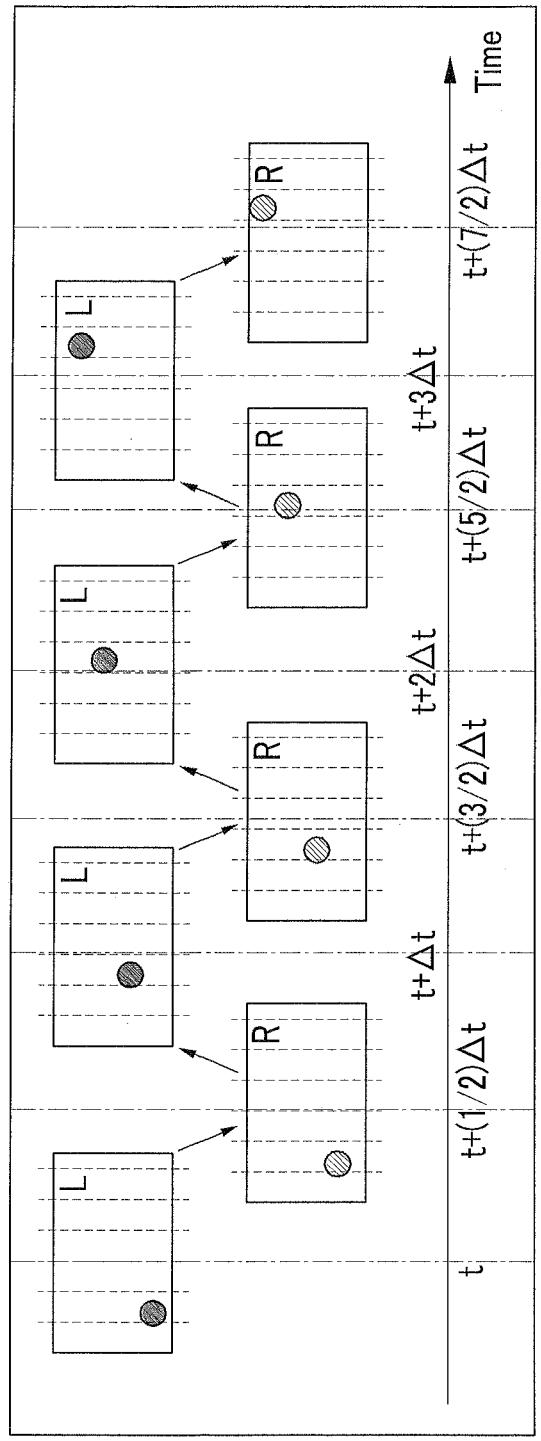

Referring to FIG. 5D, the left eye image (L) and the right eye image (R) may be subjected to at least one of an upscaling process or a time dividing process. The upscaling process includes the expansion of images, and the time dividing process includes the transmission of the left eye image (L) and the right eye image (R) at a predetermined interval. The upscaling process and the time dividing process may be performed in sequence or simultaneously.

For example, the upscaling process may be performed from the left eye image (L) of FIG. 5C to the left eye image (L) of FIG. 5D. When the left eye image (L) of FIG. 5C has an image size of 960×1080, the left eye image (L) of FIG. 5D may have an image size of 1920×1080. Similarly, the upscaling process may be performed from the right eye image (R) of FIG. 5C to the right eye image (R) of FIG. 5D. When the right eye image (R) of FIG. 5C has an image size of 960×1080, the right eye image (R) of FIG. 5D may have an image size of 1920×1080.

When the left eye image (L) and the right eye image (R) are subjected to the time dividing process at time t of FIG. 5D, the right eye image (R) may be transmitted at a time (t+$\Delta t/2$) after the left eye image (L) is transmitted at a time t. When the left eye image (L) and the right eye image (R) are subjected to the time dividing process at a time (t+$\Delta t$) of FIG. 5D, the right eye image (R) may be transmitted at a time (t+3$\Delta t/2$) after the left eye image (L) is transmitted at a time (t+$\Delta t$). Similarly, the right eye image (R) may be transmitted at a time (t+5$\Delta t/2$) after the left eye image (L) is transmitted at a time (t+2$\Delta t$), and the right eye image (R) may be transmitted at a time (t+7$\Delta t/2$) after the left eye image (L) is transmitted at a time (t+3$\Delta t$). In this exemplary embodiment, the right eye image (R) is modification image data. When the right eye image (R) is transmitted before the left eye image (L), the right eye image (R) may not be modified and the left eye image (L) may be modified. For example, the unmodified right eye image (R) may be transmitted at a time t and the modified left eye image (L) may be transmitted at a time (t+Δt/2).

Outputting the modified right eye image (R) at a time (t+Δt/2) after the unmodified left eye image (L) is output at a time t may prevent shaking and interruption of the target object, thus improving the display quality. For example, when Δt is 1/60 second, the left eye image (L) and the right eye image (R) shot by two cameras at a time t are transmitted to the 3D image display device. The 3D image display device outputs the left eye image (L) at time t without modification. The 3D image display device then modifies the right eye image (R) and outputs the modified right eye image (R) at a time (t+1/120). The modified right eye image (R) output at time (t+1/120) is formed using modification image data based on the right eye image (R) at time t and the right eye image (R) at time (t+1/60).

By way of comparison, if an unmodified right eye image (R) is output at time (t+Δt/2) after an unmodified left eye image (L) is output at time t, shaking and interruption of the target object may occur. For example, when Δt is 1/60 second, the left eye image (L) and the right eye image (R) shot by two cameras at time t are transmitted to the 3D image display device. The 3D image display device outputs the left eye image (L) at time t without modification, and outputs the right eye image (R) at time (t+1/120) without modification. As a result, because the right eye image (R) shot at the same time as the left eye image (L) is temporally delayed and output, the target object may as appear to be shaking or interrupted when seen by the viewer.

A method for forming modification image data in the 3D display device will be described with reference to FIG. 6.

Figure 6:
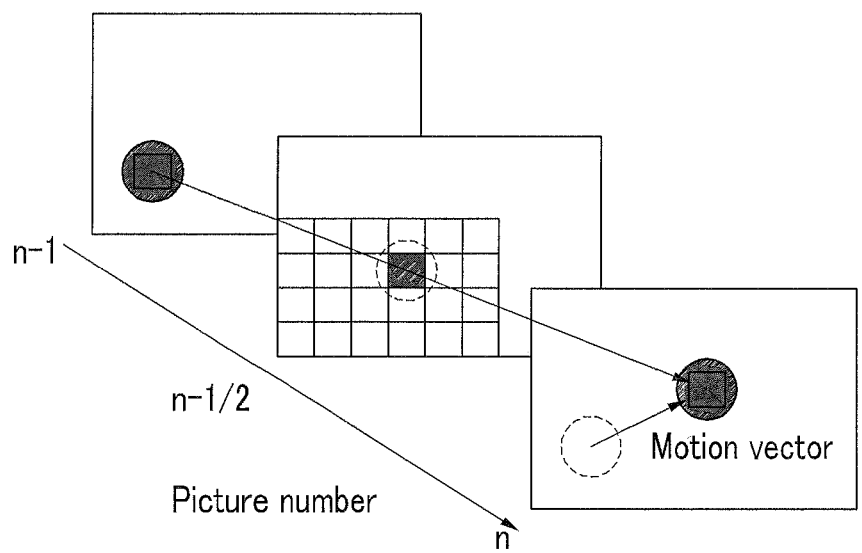
FIG. 6 is a diagram schematically showing a process of modifying image data.

FIG. 6 is a diagram schematically showing a process of modifying image data.

The modification image data may be formed based on a motion vector of moving objects. For example, when the time interval between the (n−1)th image and the nth image is t, and the time interval between the (n−1)th image and the (n−½)th image is t/2, a motion vector may be obtained from the position of the object and time t for the object at the (n−1)th image and the object at the nth image. The position of the object at the (n−½)th image may be calculated using the motion vector and the position of the object at the (n−1)th image.

The operation of the 3D image display device according to an exemplary embodiment of the present invention will be described in detail with reference to FIGS. 7 to 8C.

Figure 8A:
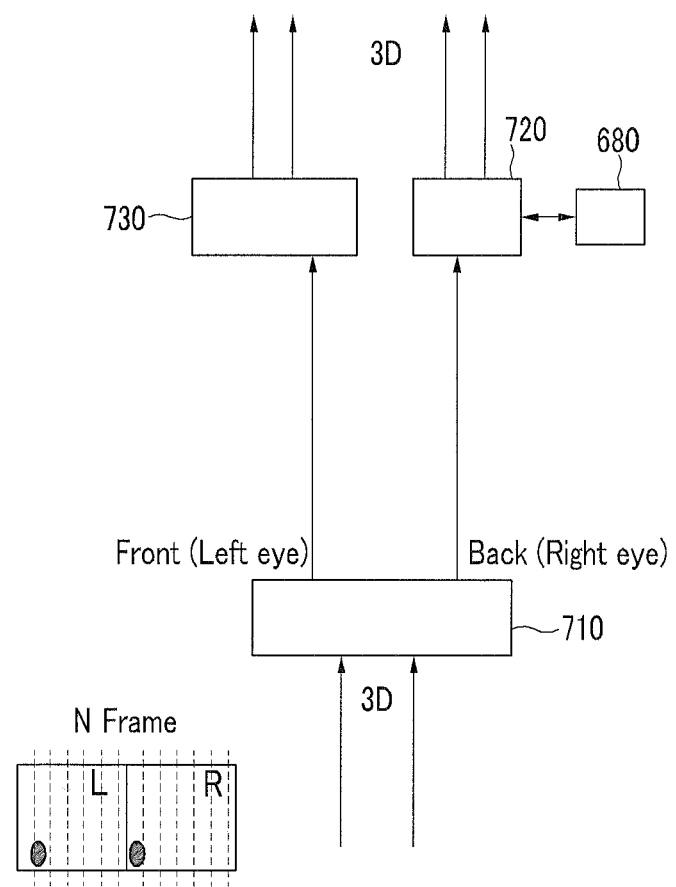
FIGS. 8A to 8C are diagrams schematically showing the operation of the 3D image display device shown in FIG. 7.
Figure 8B:
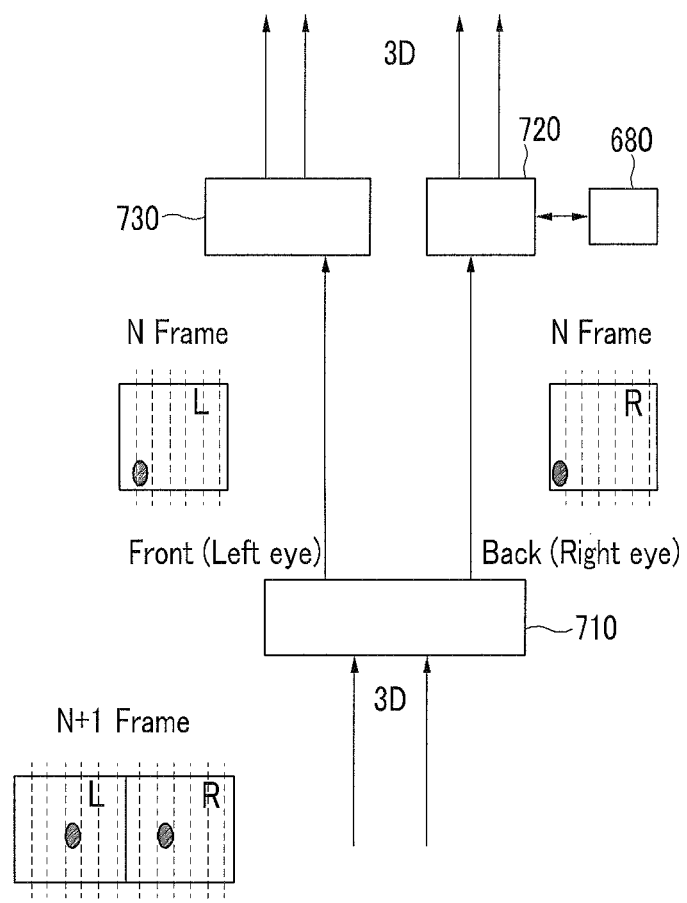

FIG. 7 is a block diagram schematically showing the 3D image display device according to an exemplary embodiment of the present invention. FIGS. 8A to 8C are diagrams schematically showing the operation of the 3D image display device shown in FIG. 7.

In FIG. 7, the data receiving unit 630 receives images shot by a shooting device such as, for example, a camera. The received images may include 2D image data or 3D image data. If 3D image data is received, the left eye image data and the right eye image data may be received together.

When 2D image data is received by the data receiving unit 630, the 2D image data may be modified in the data modification unit 650. The data modification unit 650 may modify image data of the current frame based on image data of the previous frame and image data of the next frame. The image data of the current and next frames may be stored in a data storing unit 680. The data storing unit 680 may include a memory such as, for example, an external memory or an embedded memory. The data modification unit 650 may divide the received 2D image data into two portions, and then modify the two portions of 2D image data. For example, the data modification unit 650 may receive 2D image data having an image size of 1920×1080. The received 2D image data may then be divided into image data having a size of 960× 1080 on the front side and image data having a size of 960× 1080 on the back side. The divided image data may then be modified separately. In an exemplary embodiment, the data modification unit 650 may process the entire received 2D image data without dividing it into separate data. The data modification unit 650 may also divide the received 2D image data into three or more portions, and then may process the divided portions of image data.

The modified 2D image data may bypass an image converting unit 750, and may be transmitted to the signal controller 600. The modified 2D image data may then be transmitted to a display area of the display device through an intra panel interface. As shown in FIG. 7, the signal controller 600 may include two separate components, however, the signal controller 600 is not limited thereto. For example, the signal controller 600 may include a single component or three or more components. The signal controller 600 may include the data storing unit 680.

When 3D image data is received by the data receiving unit 630, the image data of one frame including the left eye image data and the right eye image data may be received. For example, image data including left eye image data having a size of 1920×1080 and right eye image data having a size of 960×1080 may be received together in one frame at the data receiving unit 630. Referring to FIG. 8A, the image data of the Nth frame including the left eye image data and the right eye image data may be transmitted to an image dividing unit 710.

The image dividing unit 710 divides the image data into the left eye image data and the right eye image data. When the left eye image (L) is output to the display device 100 before the right eye image (R), the left eye image data may be transmitted to an image delaying unit 730 and the right eye image data may be transmitted to an image modification unit 720. Similarly, when the right eye image (R) is output to the display device 100 before the left eye image (L), the right eye image data may be transmitted to the image delaying unit 730 and the left eye image data may be transmitted to the image modification unit 720. Referring to FIG. 8B, the image data of the Nth frame is divided into the left eye image data and the right eye image data. The left eye image data is transmitted to the image delaying unit 730, and the right eye image data is transmitted to the image modification unit 720. The image data of the (N+1)th frame including the left eye image (L) and the right eye image (R) is then transmitted to the image converting unit 750. As shown in FIG. 8B, the target object of the image of the (N+1)th frame moves to another location relative to the target object of the image of the Nth frame.

The image modification unit 720 modifies right eye image data of the current frame based on right eye image data of the next frame and right eye image data of the current frame stored in the data storing unit 680. The image modification unit 720 transmits the modification image data to the image converting unit 750. Similarly, when the right eye image (R) is output to the display device 100 before the left eye image (L), the image modification unit 720 modifies the left eye image data of the current frame based on the left eye image data of the next frame and the left eye image data of the current frame stored in the data storing unit 680. The image modification unit 720 transmits the modification image data to the image converting unit 750. The image modification unit 720 may utilize methods such as, for example, a motion estimation method, a motion interpolation method or a motion compensation method. For example, a modification method using the motion vector shown in FIG. 6 may also be used.

After the image delaying unit 730 delays the left eye image data of the current frame while the right eye image data of the current frame is modified in the image modification unit 720, the image delaying unit 730 transmits the left eye image data of the current frame to the image converting unit 750. Similarly, when the right eye image (R) is output to the display device 100 before the left eye image (L), the image delaying unit 730 delays the right eye image data of the current frame while the left eye image data of the current frame is modified in the image modification unit 720. After delaying the right eye image data, the image delaying unit 730 transmits the right eye image data of the current frame to the image converting unit 750. In an exemplary embodiment, the image delaying unit 730 may utilize a buffer.

Figure 8C:
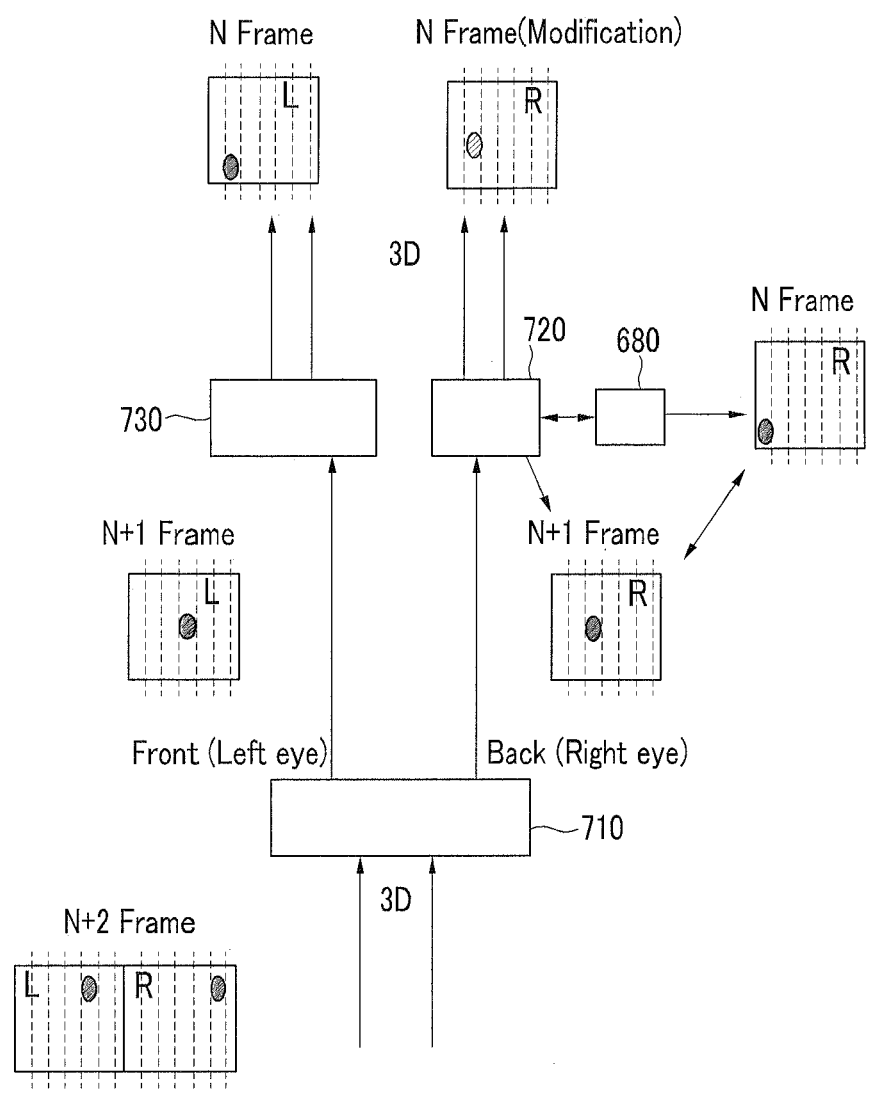

Referring to FIG. 8C, when the left eye image (L) is output to the display device before the right eye image (R), the right eye image data of the Nth frame is stored in the data storing unit 680 through the image modification unit 720, and the left eye image data of the Nth frame is transmitted to the image delaying unit 730. When the right eye image data of the (N+1)th frame is transmitted to the image modification unit 720, the image modification unit 720 forms modification image data using, for example, a motion vector for the right eye image data of the Nth frame and the right eye image data of the (N+1)th frame. After forming the modification image data, the image modification unit 720 transmits the modification image data to the image converting unit 750. While the right eye image data is being modified in the image modification unit 720, the left eye image data is delayed in the image delaying unit 730. When the modification image data is transmitted to the image converting unit 750, the left eye image data of the delayed Nth frame is transmitted to the image converting unit 750.

When the 3D image data including the left eye image data and the right eye image data is transmitted to the image converting unit 750, the 3D image data may be subjected to at least one of the upscaling process or the time-dividing process. As described above, the upscaling process and the time-dividing process may be performed sequentially or simultaneously. The 3D image data may further be subjected to a black image insertion process. The black image insertion process may be used to prevent motion blur by inserting a black image between the left eye image data and the right eye image data during output. The black image insertion process is not limited to a black image. For example, a white or gray image may be inserted between the left eye image data and the right eye image data. When the left eye image (L) having a frequency of 60 Hz and the right eye image (R) having a frequency of 60 Hz are shot respectively, 3D image data having a frequency of 60 Hz including the left eye image data and the right eye image data is received in the data receiving unit 630. As a result, the left eye image data and the right eye image data are alternately transmitted at a frequency of 120 Hz through the time-dividing process. Thus, the left eye image data, the black image data, the right eye image data, and the black image data may be sequentially transmitted at 240 Hz through the black image insertion process. The image converting unit 750 may be activated by the 3D enable signal (3D_EN) to convert the 3D image data, and may be synchronized with, for example, an IR transmitter. For example, the IR transmitter may communicate with an IR receiver of the shutter member 300.

The left eye image data and the right eye image data are transmitted from the image converting unit 750 to the signal controller 600, and are then transmitted to each pixel of the display device 100 through the intra panel interface. The signal controller 600 may include two components as shown in FIG. 7, however, the signal controller 600 is not limited thereto. The signal controller 600 may be connected to the data storing unit 680, or may include the data storing unit 680. The signal controller 600 of FIG. 7 may operate in a similar manner as the image signal processor 160 of FIG. 2.

The signal controller 600 receives the input image signal and an input control signal controlling the signal controller 600. The input control signal may include, for example, a vertical synchronization signal, a horizontal synchronizing signal, a main clock signal and/or a data enable signal. The signal controller 600 processes the input image signal to meet the operation conditions of the display device 100 based on the input image signal and the input control signal. The signal controller 600 generates the control signal, and transmits the control signal to the driver of the display device 100. For example, when the display device 100 includes the gate driver 120 and the data driver 140, the signal controller 600 may generate the gate control signal CONT2 and the data control signal CONT3. The signal controller 600 may transmit the gate control signal CONT2 to the gate driver 120 and may transmit the data control signal CONT3 and the processed image signal to the data driver 140.

Although exemplary embodiments of the present invention have been described hereinabove, it should be understood that the present disclosure is not limited to these embodiments, but may be modified by those skilled in the art without departing from the spirit and scope of the present invention, as defined by the appended claims.

What is claimed is:

1. A 3D image display device, comprising:
    a data receiving unit configured to receive frame data including left eye image data and right eye image data;
    an image modification unit configured to generate modification image data corresponding to one of the left eye image data and the right eye image data, and replace one of the left eye image data and the right eye image data with the modification image data such that one of the left eye image data and the right eye image data is the modification image data;
    an image delaying unit configured to delay the other one of the left eye image data and the right eye image data during generation of the modification image data; and
    an image converting unit configured to upscale each of the left eye image data and the right eye image data, and time-divide the left eye image data and the right eye image data,
    wherein the modification image data corresponding to the left eye image data is based on left eye image data of a current frame and left eye image data of a next frame, and the modification image data corresponding to the right eye image data is based on right eye image data of the current frame and right eye image data of the next frame.

2. The 3D image display device of claim 1, wherein:
    the image modification unit is configured to generate the modification image data using a motion vector.

3. The 3D image display device of claim 1, further comprising:
    a data storing unit connected to the image modification unit, configured to store the left eye image data of the current frame or the right eye image data of the current frame.

4. The 3D image display device of claim 1, further comprising:
   an image dividing unit configured to divide the frame data into the left eye image data and the right eye image data, transmit one of the left eye image data and the right eye image data to the image modification unit, and transmit the other one of the left eye image data and the right eye image data to the image delaying unit.

5. The 3D image display device of claim 1, wherein:
   the image converting unit is configured to insert black image data between an input period of the left eye image data and an input period of the right eye image data.

6. The 3D image display device of claim 1, wherein:
   the image converting unit is configured to bypass 2D image data.

7. The 3D image display device of claim 1, further comprising:
   a shutter member including a left eye shutter and a right eye shutter,
   wherein the left eye shutter is opened after a predetermined time, wherein the predetermined time starts when an input of the left eye image data completes, or
   the right eye shutter is opened after the predetermined time, wherein the predetermined time starts when an input of the right eye image data completes.

8. The 3D image display device of claim 7, further comprising:
   a display device including a liquid crystal material,
   wherein the predetermined time is based on a response time of the liquid crystal material.

9. The 3D image display device of claim 1, further comprising:
   a shutter member including a left eye shutter and a right eye shutter,
   wherein one of the left eye shutter and the right eye shutter is opened and the other one of the left eye shutter and the right eye shutter is closed between an input period of the left eye image data and an input period of the right eye image data.

10. The 3D image display device of claim 1, wherein:
   the left eye image data is not modified at each time interval that the right eye image data is modified, and
   the right eye image data is not modified at each time interval that the left eye image data is modified.

11. The 3D image display device of claim 10, wherein:
   the left eye image data is transmitted to the image delaying unit and the right eye image data is transmitted to the image modification unit when the left eye image data is output to the display device before the right eye image data, and
   the right eye image data is transmitted to the image delaying unit and the left eye image data is transmitted to the image modification unit when the right eye image data is output to the display device before the left eye image data.

12. The 3D image display device of claim 1, wherein:
   the image converting unit is configured to upscale each of the left eye image data and the right eye image data to increase a size of each of the left eye image data and the right eye image data to be larger than an original size of the left eye image data and the right eye image data, respectively.

13. A method of driving a 3D image display device, comprising:
   receiving left eye image data and right eye image data;
   modifying one of the left eye image data and the right eye image data;
   delaying the other one of the left eye image data and the right eye image data during modification of the one of the left eye image data and the right eye image data;
   upscaling each of the left eye image data and the right eye image data; and
   time-dividing the left eye image data and the right eye image data,
   wherein the left eye image data is modified based on left eye image data of a current frame and left eye image data of a next frame, and the right eye image data is modified based on right eye image data of the current frame and right eye image data of the next frame.

14. The method of driving a 3D image display device of claim 13, wherein:
   modifying one of the left eye image data and the right eye image data is based on a motion vector.

15. The method of driving a 3D image display device of claim 13, further comprising:
   receiving frame data including the left eye image data and the right eye image data, and
   dividing the frame data into the left eye image data and the right eye image data.

16. The method of driving a 3D image display device of claim 13, further comprising:
   inserting black image data between an input period of the left eye image data and an input period of the right eye image data.

17. The method of driving a 3D image display device of claim 13, wherein:
   the left eye image data is not modified at each time interval that the right eye image data is modified, and
   the right eye image data is not modified at each time interval that the left eye image data is modified.

18. The method of driving a 3D image display device of claim 17, wherein:
   the left eye image data is delayed and the right eye image data is modified when the left eye image data is output to the display device before the right eye image data, and
   the right eye image data is delayed and the left eye image data is modified when the right eye image data is output to the display device before the left eye image data.

19. The method of driving a 3D image display device of claim 13, wherein:
   upscaling each of the left eye image data and the right eye image data comprises increasing a size of each of the left eye image data and the right eye image data to be larger than an original size of the left eye image data and the right eye image data, respectively.

20. A 3D image display device, comprising:
   a data receiving unit configured to receive frame data including left eye image data and right eye image data;
   an image dividing unit configured to divide the frame data into the left eye image data and the right eye image data;
   an image modification unit configured to generate modification image data corresponding to one of the left eye image data and the right eye image data, and replace the other one of the left eye image data and the right eye image data with the modification image data such that the other one of the left eye image data and the right eye image data is the modification image data;
   an image delaying unit configured to delay the other one of the left eye image data and the right eye image data during generation of the modification image data; and
   an image converting unit configured to upscale each of the left eye image data and the right eye image data, and time-divide the left eye image data and the right eye image data, wherein modification image data corresponding to the left eye image data is based on left eye image data of a current frame and left eye image data of a next frame, and modification image data corresponding to the right eye image data is based on right eye image data of the current frame and right eye image data of the next frame.

21. The 3D image display device of claim 19, wherein:

the left eye image data is not modified at each time interval that the right eye image data is modified, and the right eye image data is not modified at each time interval that the left eye image data is modified.

22. The 3D image display device of claim 21, wherein:

the left eye image data is transmitted to the image delaying unit and the right eye image data is transmitted to the image modification unit when the left eye image data is output to the display device before the right eye image data, and the right eye image data is transmitted to the image delaying unit and the left eye image data is transmitted to the image modification unit when the right eye image data is output to the display device before the left eye image data.

23. The 3D image display device of claim 20, wherein:

the image converting unit is configured to upscale each of the left eye image data and the right eye image data to increase a size of each of the left eye image data and the right eye image data to be larger than an original size of the left eye image data and the right eye image data, respectively.

\* \* \* \* \*